United States Patent [19]

Saarinen et al.

[11] 4,323,541

[45] Apr. 6, 1982

[54] SELECTIVE TWO STAGE LEACHING OF NICKEL FROM NICKEL-COPPER MATTE

[75] Inventors: Heimo U. A. Saarinen; Matti Seilo, both of Harjavalta, Finland

[73] Assignee: Outokumpu Oy, Helsinki, Finland

[21] Appl. No.: 160,503

[22] Filed: Jun. 18, 1980

[30] Foreign Application Priority Data

Jun. 29, 1979 [FI] Finland .................................. 792057

[51] Int. Cl.$^3$ ......................... C25C 1/06; C22B 15/14
[52] U.S. Cl. ...................................... 423/37; 423/48; 423/150; 204/112
[58] Field of Search ...................... 423/41, 48, 150, 37; 204/112

[56] References Cited

U.S. PATENT DOCUMENTS

| | | | |
|---|---|---|---|
| 1,756,092 | 4/1930 | Lathe | 423/150 |
| 3,293,027 | 12/1966 | Mackiw | 423/37 |
| 3,741,752 | 6/1973 | Evans | 423/37 |
| 3,962,051 | 1/1976 | Symens | 423/150 |
| 4,042,474 | 8/1977 | Saarinen | 423/150 |
| 4,093,526 | 6/1978 | Blanco | 75/119 |
| 4,100,043 | 7/1978 | Chou | 423/41 |
| 4,130,626 | 12/1978 | Hoover | 423/41 |

Primary Examiner—Brian E. Hearn
Attorney, Agent, or Firm—Brooks, Haidt, Haffner & Delahunty

[57] ABSTRACT

A finely-ground nickel-copper matte is leached using an acid at a minimum temperature of approx. 80° C. and under oxidizing conditions in order to produce a nickel sulfate solution and a nickel-cooper sulfide residue, which is separated from the solution and thereafter the nickel-copper sulfide residue is leached using acid in an autoclave at a minimum temperature of 110° C. and under oxidizing conditions in order to produce an additional quantity of nickel sulfate solution and a copper sulfide precipitate.

9 Claims, 2 Drawing Figures

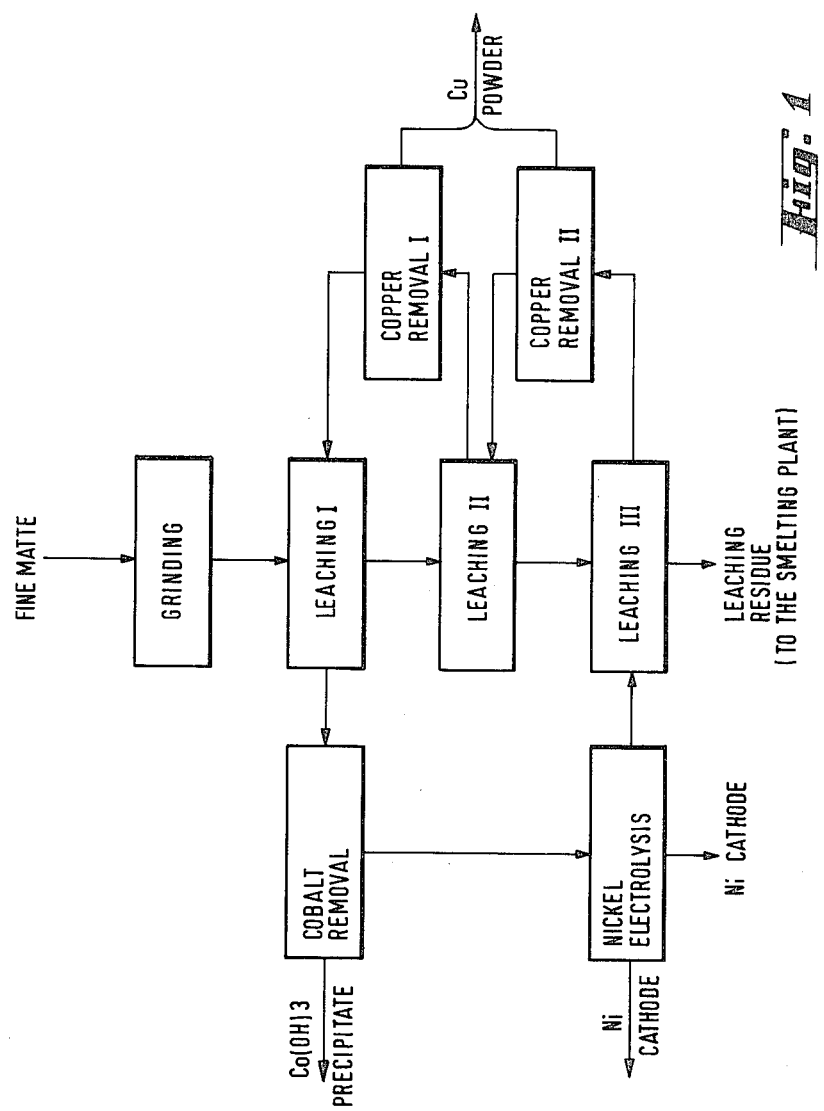

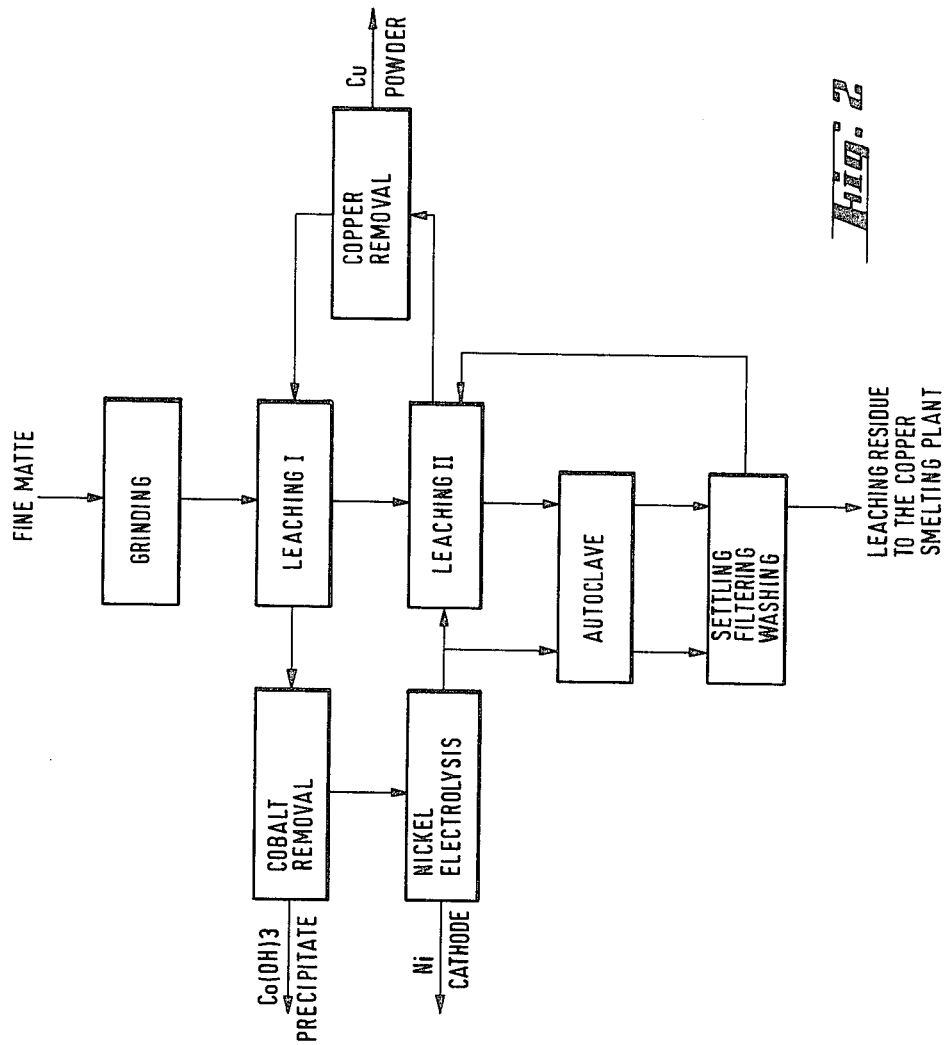

SELECTIVE TWO STAGE LEACHING OF NICKEL FROM NICKEL-COPPER MATTE

BACKGROUND OF THE INVENTION

The present invention relates to a process for selective leaching of nickel-copper matte and especially to a process in which finely ground nickel-copper matte is leached using acid at an elevated temperature and under oxidizing conditions in order to produce a nickel sulfate solution and a copper sulfide precipitate.

Previously known is a process for refining nickel matte to high-grade cathode nickel, copper powder and cobalt hydroxy precipitate, comprising five principal stages: matte grinding, leaching, copper removal, cobalt removal, and nickel electrolysis. The Flow scheme of this known process is shown in FIG. 1.

The matte is wet ground in a ball mill. The average particle size of the ground matte passing to the leaching stage is 20–30$\mu$ and its chemical composition is approximately as follows: 55% Ni, 35% Cu, 1% Co, and 6% S and the sieve analysis 90% under 0.094 mm.

The leaching is performed in two or more stages countercurrently, using the anolyte of the nickel electrolysis. Mineralogically the matte consists of the following constituents: Ni-Cu alloy, nickel sulfide $Ni_3S_2$, and copper sulfide $Cu_2S$. The leaching is based on the following chemical reactions:

$$Cu^{++} + Ni = Cu\downarrow + Ni^{++} \tag{1}$$

$$Cu + \tfrac{1}{2}O_2 = CuO \tag{2}$$

$$CuO + H_2SO_4 = CuSO_4 + H_2O \tag{3}$$

$$Ni_3S_2 + H_2SO_4 + \tfrac{1}{2}O_2 = NiSO_4 + 2NiS + H_2O \tag{4}$$

During the first leaching stage, the ground matte meets the solution coming from the first copper removal stage. This solution contains copper ions and sulfuric acid as active components. Reactions 1–3 continue until the copper is completely precipitated and the solution is neutralized.

After the first leaching stage, the solid material in the reactors is settled and directed to the second leaching stage. The overflow solution from the settler is filtered and directed to the cobalt removal.

During the second leaching stage, the already partly reacted matte material meets a solution coming from the second copper removal stage. As in the first leaching stage, the active constituents of the solution are copper ions and sulfuric acid. The leaching reactions occur according to Reactions 1–4. After the second leaching stage, solid material is settled and directed to the third leaching stage. The overflow solution from the settler is filtered and directed to the copper removal.

During the third leaching stage, the matte which has undergone the first and second leaching stages meets the overflow solution from the nickel electrolysis, which contains sulfuric acid 50 g/l as the active constituent. Reactions 1–4 continue until the bulk of the soluble metals (Ni, Cu, Co) of the matte has dissolved.

Sulfur is insoluble in an atmospheric leaching process and combines with part of the nickel and copper present in the matte. This part, the leach residue, is settled, filtered and returned to the nickel smelting plant. The overflow solution from the settler is filtered and directed to the copper removal.

That part of the copper which has been leached during the second and the third leaching stages is removed electrolytically. Sulfuric acid is produced as a product of the electrolysis at the insoluble lead anode, and this sulfuric acid is used for the leaching. Owing to the high cathodic current density, the copper is precipitated in powder form.

The solution from the first leaching stage is directed to the cobalt removal, where cobalt is precipitated out from the solution by using trivalent nickel ($Ni(OH)_3$):

$$Co^{++} + Ni(OH)_3 = Co(OH)_3 + Ni^{++} \tag{5}$$

Nickel(III) hydroxide is produced by oxidizing nickel-(II) hydroxide in special oxidation vessels by means of electric current. Nickel(II) hydroxide is precipitated out from the nickel electrolyte by means of sodium hydroxide. Other impurities such as copper, zinc, iron, arsenic, lead, antimony, etc. are also precipitated out from the electrolyte during the cobalt removal stage.

Owing to the use of sodium hydroxide for the precipitation of nickel(II) hydroxide, sodium sulfate is produced during the process. In order to maintain a certain sodium sulfate level, Glauber salt is crystallized out from the process solution.

The last stage of the process is the electrolytic separation of nickel in a so-called diaphragm electrolysis. The cathode is situated in a diaphragm bag into which pure nickel electrolyte is fed. The anode material is pure lead.

The electrode reactions are as follows:

$$Ni^{++} + 2e^- = Ni\downarrow \text{ (Cathode)} \tag{6}$$

$$SO_4^= + H_2O = H_2SO_4 + \tfrac{1}{2}O_2 + 2e^- \text{(Anode)} \tag{7}$$

The sulfuric acid anodically produced during the electrolysis is used for the leaching of the matte, since the overflow solution, the so-called anolyte, from the electrolysis tanks is returned to the leaching cycle. The period of growth of the cathode from the thin start sheet to a full weight cathode (80 kg each) is about 7 days, whereafter it is removed, washed, cut and packaged for selling. The removed cathode is again replaced with a new thin nickel start sheet for growing.

This prior known process is very flexible considering the Ni-Cu ratio in the raw material, i.e. nickel-copper matte. Two comparison experiments on a pilot scale are given below. In these experiments, the described known leaching process is applied to different types of Ni-Cu mattes.

COMPARISON EXPERIMENT 1

Ground matte having the following composition:
Ni—88.2%
Cu—1.9%
Co—1.2%
S—7.4%
and a sieve analysis of 75% under 0.094 mm, was leached in two stages by a prior known method. The following yields of the matte constituents into the solution were obtained in the leaching:
Ni—82%
Cu—0%
Co—81%
S—0%
The leach residue was 24% of the quantity of the matte feed, and its composition was Ni—52%
Cu—6.3%
Co—0.8%
S—30%

COMPARISON EXPERIMENTS 2

Ground matte having the following composition:
Ni—26.8%
Cu—62.6%
S—5.7%
and a sieve analysis of 89% under 0.094 mm was leached in four stages. The following yields of the matte constituents passing into the solution were obtained in the leaching:
Ni—97%
Cu—66%
S—0%
The leach residue was 29% of the quantity of the matte feed, and its composition was as follows:
Ni—2.7%
Cu—74.4%
S—20.0%
It is seen from the above examples that the known leaching process described above can well be applied to mattes having a composition within the ranges:
Ni—27–88%
Cu—2–63%
S—5–7%
the composition of the leach residue being within the ranges:
Ni—3–52%
Cu—6–74%
S—20–30%
The leach residue is 24–29% of the quantity of the matte feed.

It is observed from the comparison experiments that with an increased Ni-Cu ratio in the matte the Ni concentration in the leach residue increases sharply and requires the cycling of the residue to the smelting process.

In the process currently in use of the leach residue is returned to the nickel smelting process. A large portion of the material is thus cycled between the nickel smelting plant and the nickel factory. This, for its part, causes great expense consisting of the following:
a. Treatment losses
b. Drying and smelting costs
c. Transportation costs
d. Costs due to the grinding and leaching stages The above costs can be eliminated if it is possible to treat the leach residue in such a manner that it no longer needs to be returned to the nickel smelting process.

U.S. Pat. No. 3,741,752 discloses a process in which a three-stage pressure leaching process is applied, instead of atmospheric leaching, to the leaching of nickel-copper matte. Practically all of the matte material is leached in this process. Thus the process also requires a sulfur removal stage.

It is presumably generally known that pressure leaching as a continuous process is a considerably more expensive alternative than atmospheric leaching as regards the capital and operating costs. Furthermore, it is by no means always economically well-founded to leach all of the sulfur and copper present in nickel-copper matte but rather to leave them undissolved, while only the nickel content of the matte is leached as completely as possible.

The object of the present invention is therefore to provide a process for selective leaching of nickel-copper matte, eliminating the disadvantages involved in the prior known processes mentioned above. The object of the present invention is in particular to provide a more economical process for selective leaching of nickel-copper matte, in which the leach residue can be fed directly to the copper smelting plant.

SUMMARY OF THE INVENTION

According to the invention there is provided a process for selective leaching of nickel-copper matte, wherein (a) a finely-ground nickel-copper matte is leached using an acid at a minimum temperature of approx. 80° C. and under oxidizing conditions in order to produce a nickel sulfate solution and a nickel-copper sulfide residue, which is separated from the solution and (b) thereafter the said nickel-copper sulfide residue is leached using acid in an autoclave at a minimum temperature of 110° C. and under oxidizing conditions in order to produce an additional quantity of nickel sulfate solution and a copper sulfide precipitate.

DESCRIPTION OF THE DRAWINGS

FIG. 1 illustrates a flow sheme according to the prior art and

FIG. 2 depicts the flow scheme of a preferred embodiment of the invention, in which the disadvantages of the above multistage pressure leaching processes have been eliminated.

DESCRIPTION OF THE PREFERRED EMBODIMENT

In the process depicted in FIG. 2, the atmospheric leaching comprises 2 stages, but, depending on the composition of the matte, it can be a 2–4 stage countercurrent leaching. The following advantages are gained using the process depicted in FIG. 2, as compared with the prior known processes described above:
a. Most of the matte to be leached is leached in an economical atmospheric leaching process.
b. The process does not require sulfur removal.
c. A large portion of the copper can be withdrawn from the process at low cost as a leach residue which contains the noble metals of the matte and is usable as raw material for copper.

The theoretical background of the pressure leaching in conjunction with atmospheric leaching is as follows: The composition as reagards the main constituents of the leach residue of atmospheric leaching is
Ni—3–52%
Cu—6–74%
S—20–30%
and it also contains salt of the mother liquor ($Na_2SO_4$, $NiSO_4$) and a filter aid.

Mineralogically the residue consists of seconrady sulfides NiS and CuS and of pyrometallurgical copper sulfide $Cu_2S$. By selecting favorable leaching conditions, a mixture consisting of the above sulfides can be leached using a sulfuric acid bearing solution as follows:

$$NiS + CuS + Cu_2S + H_2SO_4 + 1/2O_2 = NiSO_4 + 3CuS + H_2O \qquad (8)$$

The leaching of the various constituents occurs under the conditions involved according to the following mechanisms:

$$NiS + H_2SO_4 = NiSO_4 + H_2S \uparrow \quad (9)$$

$$CuS + O_2 = CuSO_4 \quad (10)$$

$$Cu_2S + H_2SO_4 + 1/2O_2 = CuSO_4 + CuS + H_2O \quad (11)$$

It can be concluded on the basis of the above reaction equations that by regulating the oxidation during the pressure leaching the dissolving of the copper sulfides can be adjusted and maintained at a level which is barely sufficient for the hydrogen sulfide released during Reaction (9) to combine with the copper present in the solution:

$$H_2S + CuSO_4 = CuS \downarrow + H_2SO_4 \quad (12)$$

On the basis of the reaction equations given above, under favorable oxidation conditions a very high nickel solubility is obtained for the sulfide precipitate which has the mineralogical composition of the leach residue of the known atmospheric leaching described above, whereas the solubilities of copper and sulfur are very low.

The invention is described below in more detail with the aid of examples. The atmospheric-leach residue used as the initial material in the examples below has been obtained by leaching a finely-ground nickel-copper matte with sulfuric acid at a minimum temperature of about 80° C. and under oxidizing conditions in order to produce a nickel sulfate solution and the said residue, which is separated from the solution and directed to autoclave leaching. The atmospheric leaching can be performed as a countercurrent leaching of either two or several stages, at a temperature which is close to the boiling point of the solution. The acid used is sulfuric acid and the oxidizing conditions are obtained by contact with air.

Alternatively, even some other oxidizing agent, e.g. oxygen, ozone, hydrogen peroxide, can be used.

EXAMPLE 1

The autoclave was charged as follows:

|  | Solution | Residue from atmospheric leaching |
|---|---|---|
| Ni | 70 g/l | 15.7% |
| Cu | 0 g/l | 52.9% |
| S | — | 18.8% |
| $H_2SO_4$ | 50 g/l | — |
| $Na_2SO_4$ | 150 g/l | — |
| Quantity | 1 l | 100 g |

The conditions were: temperature 140° C., leaching period 3 h, propeller mixing, air through-flow 10 l/h, air pressure 10 bar.

After the said reaction period, the analyses of the solution and the solid were:

|  | Solution | Residue from pressure leaching |
|---|---|---|
| Ni | 84.9 g/l | 1.0% |
| Cu | 4.3 g/l | 67.7% |
| S | — | 23.7% |
| $H_2SO_4$ | 18.3 g/l | — |
| $Na_2SO_4$ | 150 g/l | — |
| Quantity | 1 l | 71.6 g |

The following solubilities were calculated from the above results:
Ni-solubility—95.4%
Cu-solubility—8.4%
S-solubility—9.7%

EXAMPLE 2

The autoclave was charged as follows:

|  | Solution | Residue from atmospheric leaching |
|---|---|---|
| Ni | 70 g/l | 24.0% |
| Cu | 0 g/l | 42.9% |
| S | — | 14.2% |
| $H_2SO_4$ | 53 g/l | — |
| $Na_2SO_4$ | 150 g/l | — |
| Quantity | 1 l | 100 g |

The conditions were: temperature 130° C., leaching period 3 h, propeller mixing, air through-flow 10 l/h, air pressure 10 bar.

After the leaching, the analyses of the solution and the solid were:

|  | Solution | Residue from pressure leaching |
|---|---|---|
| Ni | 92.9 g/l | 2.8% |
| Cu | 0.3 g/l | 70.7% |
| S | — | 21.0% |
| $H_2SO_4$ | 19.2 g/l | — |
| $Na_2SO_4$ | 150 g/l | — |
| Quantity | 1 l | 60.3 g |

The following solubilities were obtained:
Ni-solubility—95.5%
Cu-solubility—<1%
S-solubility—10.7%

In both examples, the solubility of sulfur is for a large part composed of the dissolving of the water-soluble sulfates ($NiSO_4$ and $Na_2SO_4$) of the leach residue of the atmospheric leaching.

The solution obtained from the pressure leaching according to FIG. 2 is returned to the atmospheric leaching cycle, where its nickel and copper content is recovered.

The leach residue obtained from the pressure leaching, which contains nickel less than 3%, can be fed directly to copper production, where the noble metals present in the leach residue can also be recovered.

EXAMPLE 3

The autoclave used was a two-liter laboratory autoclave equipped with propeller mixing and a mantle coupled to an oil sump for temperature control. The stirring rate was maintained constant throughout the process. The oxidant used was compressed air, which was fed to the surface of the solution, and the out-blast was measured using a Rotameter. The experiments were carried out as batch processes without taking intermediate samples. The autoclave charge was as follows: nickel anolyte having a sulfuric acid concentration of 43–70 g/l and a volume of 1 liter, and wet leach residue from a nickel plant, its dry weight being 100 g.

(A) Effect of the air through-flow

Table 1 shows the compiled results of a series of experiments, in which the rate of out-blasted air varied within the range 0–100 l/h. The other conditions were: temperature (initial)—130° C.

leaching period—3 h
H₂SO₄ in the anolyte—53 g/l
air pressure—10 bar

H₂SO₄ in the anolyte—53 g/l
air pressure—10 bar

TABLE 3

| Temper-ature °C. | Leach residue | | | | Solution | | | Solid material % | Solubility | | |
|---|---|---|---|---|---|---|---|---|---|---|---|
| | Quantity g | Ni % | Cu % | S % | Ni g/l | Cu g/l | H₂SO₄ g/l | | Ni % | Cu % | S % |
| Initial materials | 100 | 24.0 | 42.9 | 14.2 | 70 | 0 | 53 | — | — | — | — |
| 110 | 62.8 | 5.9 | 67.8 | 19.9 | 90.3 | 0.4 | 22.1 | 37.2 | 84.6 | 1 | 12.0 |
| 130 | 61.0 | 3.0 | 70.6 | 20.6 | 92.2 | 0.1 | 20.2 | 39.0 | 92.5 | <1 | 12.5 |
| 150 | 60.9 | 1.6 | 72.9 | 20.9 | 93.0 | 0.0 | 17.7 | 39.1 | 96.0 | <1 | 10.5 | air pressure—10 bar

TABLE 1

| Through-flow g/l | Leach residue | | | | Solution | | | Solubility | | | |
|---|---|---|---|---|---|---|---|---|---|---|---|
| | Quantity g | Ni % | Cu % | S % | Ni g/l | Cu g/l | H₂SO₄ g/l | Solid % | Ni % | Cu % | S % |
| Initial materials | 100 | 24.0 | 42.9 | 14.2 | 70 | 0 | 53 | — | — | — | — |
| 0 | 61.3 | 3.0 | 70.2 | 20.3 | 92.2 | 0.1 | 19.7 | 38.7 | 92.4 | <1 | 12.4 |
| 3 | 62.3 | 3.4 | 70.2 | 20.2 | 91.8 | 0.0 | 20.2 | 37.7 | 91.0 | <1 | 11.5 |
| 10 | 60.3 | 2.8 | 70.7 | 21.0 | 92.9 | 0.3 | 19.2 | 39.7 | 85.5 | <1 | 10.7 |
| 20 | 51.1 | 4.4 | 60.1 | 23.4 | 91.7 | 11.4 | 5.1 | 48.9 | 90.5 | 28.5 | 16.0 |
| 100 | 53.2 | 4.7 | 57.3 | 23.3 | 91.5 | 14.1 | 4.0 | 46.8 | 89.5 | 33.5 | 13.0 |

(B) Effect of sulfuric acid concentration

Table 2 contains the results from three leaching experiments, in which the concentration of H₂SO₄ in the anolyte used for the leaching varied within the range 43-63 g/l. The other conditions were:
temperature—130° C.
leaching period—1 h
out-blast—100 l/h
air pressure—10 bar

TABLE 2

| H₂SO₄ in the initial solution g/l | Leach residue | | | | Solution | | | Solubility | | | |
|---|---|---|---|---|---|---|---|---|---|---|---|
| | Quantity g | Ni % | Cu % | S % | Ni g/l | Cu g/l | H₂SO₄ g/l | Solid % | Ni % | Cu % | S % |
| Initial materials | 100 | 24.0 | 42.9 | 14.2 | 70 | 0 | 43-63 | — | — | — | — |
| 43 | 60.7 | 6.7 | 66.9 | 20.1 | 89.9 | 1.2 | 13.1 | 39.3 | 83.1 | 2.5 | 14.0 |
| 53 | 60.9 | 5.6 | 67.8 | 20.3 | 90.6 | 1.1 | 21.8 | 39.1 | 86.0 | 2.4 | 13.0 |
| 63 | 58.7 | 3.6 | 68.8 | 21.5 | 91.9 | 2.5 | 30.0 | 41.3 | 91.5 | 5.7 | 11.5 |

(C) Effect of temperature

The solubilities of nickel, copper and sulfur obtained at 110° C., 130° C. and 150° C., and other test results, are shown in Table 3. In addition to the above temperatures, the test conditions were:
leaching period—3 h
out-blast—none (D) Effect of leaching period Table 4 shows the results of the experiments which tested the effect of the leaching period on selective leaching. The fixed experimental conditions were:
out-blast—none
temperature—130° C.
H₂SO₄ in the anolyte—53 g/l
air pressure—10 bar

TABLE 4

| Leaching period h | Leach residue | | | | Solution | | | Solid material % | Solubility | | |
|---|---|---|---|---|---|---|---|---|---|---|---|
| | Quantity g | Ni % | Cu % | S % | Ni g/l | Cu g/l | H₂SO₄ g/l | | Ni % | Cu % | S % |
| Initial materials | 100 | 24.0 | 42.9 | 14.2 | 70 | 0 | 53 | — | — | — | — |
| 1 | 65.7 | 6.8 | 67.8 | 19.6 | 90.9 | 0.0 | 22.8 | 34.3 | 87.2 | <1 | 9.5 |
| 3 | 63.1 | 3.0 | 70.2 | 20.3 | 92.2 | 0.1 | 19.7 | 36.9 | 92.4 | <1 | 12.4 |
| 5 | 58.7 | 1.7 | 71.3 | 21.2 | 93.0 | 0.8 | 15.2 | 41.3 | 95.9 | 2.4 | 12.4 |

(E) Effect of air pressure

The effect of air pressure on leaching is illustrated by the test results compiled in Table 5. The leaching experiments were performed with leach residue II, at air pressures of 5 and 10 bar. The other conditions were:
leaching period—3 h
temperature—140° C.
air through-flow—10 l/h
H₂SO₄ in the anolyte—50 g/l

TABLE 5

| Air pressure bar | Leach residue | | | Solution | | | Solubility Solid mat. % | Ni % | Cu % | S % |
|---|---|---|---|---|---|---|---|---|---|---|
| | Quantity g | Ni % | Cu % | S % | Ni g/l | Cu g/l | $H_2SO_4$ g/l | | | |
| Initial materials | 100 | 15.7 | 52.9 | 18.8 | 70 | 0 | 50.0 | — | — | — | — |
| 5 | 80.1 | 2.8 | 67.4 | 23.2 | 83.5 | 0 | 16.2 | 19.9 | 85.7 | 0 | 1.2 |
| 10 | 71.6 | 1.0 | 67.7 | 23.7 | 84.9 | 4.3 | 18.3 | 28.4 | 95.4 | 8.4 | 9.7 |

What is claimed is:

1. A process for selective leaching of nickel-copper matte comprising:
   (a) first leaching a finely-ground nickel-copper matte using an acid at a minimum temperature of approximately 80° C. and under oxidizing conditions in order to produce a nickel sulfate solution and a nickel-copper sulfide residue, which is separated from the solution and
   (b) thereafter leaching the nickel-copper sulfide residue using acid in an autoclave at a minimum temperature of 110° C. and under oxidizing conditions in order to produce an additional quantity of nickel sulfate solution and a copper sulfide precipitate
   (c) directing the nickel sulfate solution obtained from the autoclave solution of stage (b) to the leaching of stage (a) and
   (d) directing leach residue from stage (b) containing primarily said copper sulfide precipitate to a copper smelting plant.

2. A process according to claim 1, in which the atmospheric leaching of stage (a) is performed as a countercurrent leaching of at least two stages.

3. A process according to claim 1 or 2, in which the atmospheric leaching of stage (a) is performed at a temperature which is close to the boiling point of the solution.

4. A process according to claim 1, in which the acid used is sulfuric acid.

5. A process according to claim 1, in which the oxidizing conditions are produced by contacting the solution with air or oxygen or a mixture of both.

6. A process according to claim 1, in which in the autoclave leaching of stage (b) a sulfide residue is treated which contains nickel 10–25% by weight, copper 20–55% by weight and sulfur 12–25% by weight.

7. A process according to claim 1, in which the temperature in the autoclave leaching of stage (b) is at minimum 130° C.

8. A process according to claim 1, in which air is blown into the autoclave of stage (b) so that the partial pressure of air in the autoclave is at minimum about 5 bar.

9. A process according to claim 1, in which the concentration of $H_2SO_4$ in the autoclave solution of stage (b) is maintained at a level which is at least stoichiometric in relation to the quantity of nickel sulfide.

* * * * *

UNITED STATES PATENT AND TRADEMARK OFFICE
CERTIFICATE OF CORRECTION

PATENT NO. : 4,323,541

DATED : April 6, 1982

INVENTOR(S) : Heimo U.A. Saarinen et al

It is certified that error appears in the above—identified patent and that said Letters Patent is hereby corrected as shown below:

Column 5, line 35:

"used in" should read --used is--.

Column 5, lines 51 and 67,
Column 6, lines 17 and 32:

Last line of first column, after "Quantity",

"11" should be --1  1--.

Signed and Sealed this

Thirteenth Day of July 1982

[SEAL]

Attest:

*Attesting Officer*

GERALD J. MOSSINGHOFF

*Commissioner of Patents and Trademarks*